United States Patent

Zegers et al.

[15] 3,666,889

[45] May 30, 1972

[54] TRANSMISSION SYSTEM

[72] Inventors: Leon Eduard Zegers; Jan Kuilman; Wilfred Andre Maria Snijders, all of Emmasingel, Eindhoven, Netherlands

[73] Assignee: U.S. Philips Corporation, New York, N.Y.

[22] Filed: July 30, 1970

[21] Appl. No.: 64,121

Related U.S. Application Data

[63] Continuation of Ser. No. 663,783, Aug. 28, 1967, abandoned.

[30] Foreign Application Priority Data

Aug. 27, 1966 Netherlands..........................6612113

[52] U.S. Cl.........................................................179/15 BM

[51] Int. Cl.........................................................H04j 9/00

[58] Field of Search........................179/2 R, 15 R, 15 A, 15 BY, 15 BM, 179/84 VF, 3, 4; 178/5.1, 22, 49, 69.5; 325/122, 157

[56] References Cited

UNITED STATES PATENTS

| | | | |
|---|---|---|---|
| 2,321,651 | 6/1943 | Caraway | 179/84 VF |
| 3,305,635 | 2/1967 | Webb | 178/69.5 R |
| 3,529,088 | 9/1970 | Hauer | 179/15 BM |
| 3,586,781 | 6/1971 | Jones | 179/15 BY |

*Primary Examiner*—Ralph D. Blakeslee
*Attorney*—Frank R. Trifari

[57] ABSTRACT

A transmission system comprising a transmitter and a receiver for transmitting information in a prescribed frequency band and transmitters and receivers to be used in said system. The transmission of the information signals may in particular be effected directly or after modulation, for example, amplitude modulation, frequency modulation or pulse modulation. The overall information to be transmitted originates from a main information source and an associated auxiliary information source having a smaller information content than the main information source.

27 Claims, 9 Drawing Figures

FIG. 1

TRANSMISSION SYSTEM

This application is a continuation of Ser. No. 663,783 filed Aug. 28, 1967, now abandoned.

The information to be transmitted may have different natures, for example, speech signals, telegraphy signals, and the like, while the associated auxiliary information rather has the character of a synchronization signal, an address signal, a signalling signal, and the like. Although the information content of the auxiliary information signal is very small, it is exactly the transmission of the auxiliary information signal to which special attention should often be paid for a satisfactory transmission of the main information signal. For example, in time multiplex systems a part of the available time interval is exclusively used for the transmission of the auxiliary information in the form of synchronization pulses, while in frequency multiplex systems often a part of the available frequency band is exclusively used for the transmission of the auxiliary information in the form of a number of pilot frequencies for synchronizing the locally produced carrier wave frequencies.

The object of the invention is a different conception of a transmission system of the type mentioned in the preamble in which the transmission of the auxiliary information is effected without frequency separation and without time separation in the frequency band destined for the transmission of the main information.

The device according to the invention is characterized in that the auxiliary information signal is formed by a periodic pulse pattern which is noncorrelated with the main information signal and which is located within the frequency band of the main information signal, which pulse pattern originates from the auxiliary information source constructed as a pulse pattern generator and is combined with the main information signal in the transmitter in a linear combination device without frequency separation and without time separation, while in the receiver the main information signal and the pulse pattern located within the frequency band thereof and combined linearly therewith are applied in common to a modulation device to which also the locally generated pulse pattern is applied which originates from a local pulse pattern generator corresponding to the pulse pattern generator in the transmitter, the output of the modulation device being connected to a smoothing filter which, for automatic phase correction, is connected to a frequency-determining member of the local pulse pattern generator.

When the pulse pattern is denoted by $a(t)$, its period by T and the main information signal by $s(t)$, then the noncorrelated condition of $a(t)$ and $s(t)$ is to be understood to mean that the integral $$I(\tau) = \int_0^T s(t)a(t-\tau)dt \qquad (1)$$

for all the values of $\tau$ is substantially zero, in formula:

$$I(\tau) \approx 0; -\infty < \tau < \infty \qquad (2)$$

The invention and its advantages will now be described in greater detail with reference to the Figures.

FIG. 1 shows a transmission system according to the invention, while FIG. 2 shows a few time diagrams to explain the transmission system shown in FIG. 1;

Figures 1, 2:
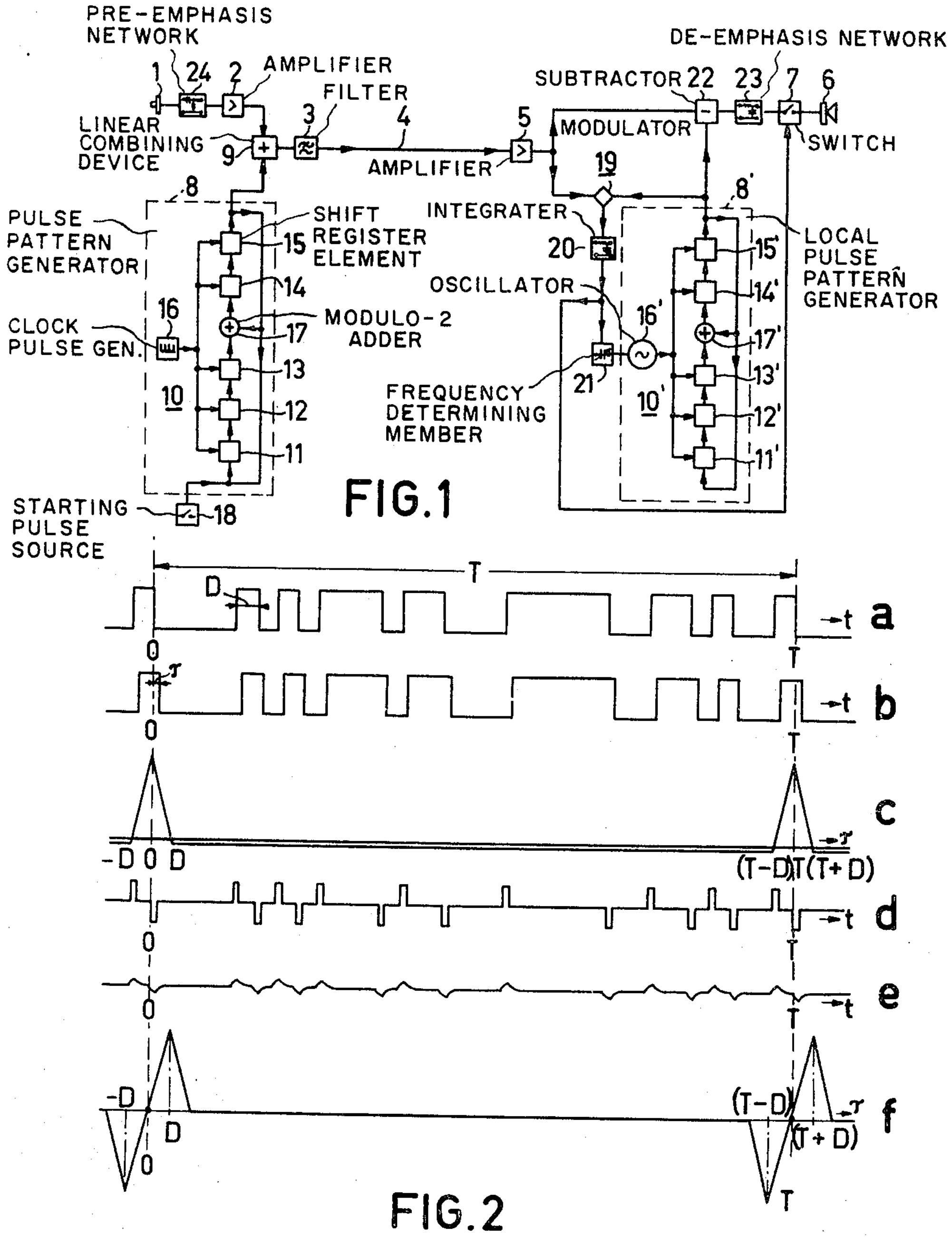

FIG. 1 shows a transmission system according to the invention comprising a transmitter and a receiver for the direct transmission of a speech signal to which a frequency band of, for example, 0–3,400 Hz is allotted. In this transmission system the speech signal originating from a microphone 1 is transmitted at the transmitter end after amplification in a transmitter amplifier 2 through a low-pass filter 3 to a transmission line 4 while at the receiver end the transmitted speech signal is applied to a reproducing device 6 after amplification in a receiver amplifier 5.

In addition to the speech signal an address signal is transmitted to effect a communication between the transmitter and the receiver which is characterized by a given address and which connects the reproducing device 6 to the receiving amplifier 5 by means of a switch 7 only when its own address is received. The overall information to be transmitted consequently consists of the speech signal from a main information source in the form of the microphone 1 and the address signal originating from an auxiliary information source in the form of an address producer, the information contents of the address signal being much smaller than that of the speech signal.

In order to achieve in the transmission system described a particularly efficient transmission of information, according to the invention, the auxiliary information signal is formed by a periodic pulse pattern which is noncorrelated with the main information signal and which is located within the frequency band of the main information signal, said pulse pattern originating from the auxiliary information source constructed as a pulse pattern generator 8 and being combined with the main information signal in the transmitter in a linear combination device 9 without frequency separation and without time separation.

In the embodiment shown in FIG. 1 in which the auxiliary information source serves as the address producer, the pulse pattern generator 8 is constructed as a feedback shift register 10 having a number of shift register elements 11, 12, 13, 14 and 15 the contacts of which are shifted by a clock pulse generator 16 connected to the shift register 10 with a constant shift period D and with a modulo-2-adder 17 which is included between the third and the fourth shift register elements 13 and 14, respectively, the output of the shift register being connected at one end to the second input of modulo-2-adder 17 and at the other end to the input of the shift register 10, a starting pulse source 18 being connected to the input of the shift register 10. As is known, a modulo-2-adder supplies an output pulse only if at the two inputs pulses of different values occur simultaneously and supplies no output pulse if the two simultaneously occurring input pulses have the same values.

If the pulse pattern generator 8 is a actuated and a single starting pulse is supplied to the shift register 10 by the starting pulse source 18, said pulse will be shifted through the shift register 10 by the clockpulse generator 16 and be fed back, through the feedback circuit, from the output to the modulo-2-adder 17 and to the input, and, as a result of said feedback, the shift register 10 will start generating a series of pulses with a recurrent period. In particular it can be proved mathematically that the pulse pattern, occurring when $n$ shift register elements are used in cascade and in the case of a suitable choice of the location of modulo-2-adders, has a period $(2^n-1)$D, in which D is the length of the shift period; for example, in the pulse pattern generator shown in FIG. 1, in which $n = 5$, the period $T$ of the pulse pattern is $(2^5-1)\ D = 31\ D$. In the embodiment shown the pulse pattern occurring at the output of the pulse pattern generator 8 with a period 31 D has the shape as shown in FIG. 2*a*, which pulse pattern serves as the address signal which, in the linear combination device 9, is combined with the speech signal within the speech band of O – 3,400 Hz without frequency separation and without time separation.

At the receiver end the main information signal and the pulse pattern located within the frequency band thereof and combined linearly therewith are applied in common to a modulation device 19 to which also the locally generated pulse pattern is applied which originates from a local pulse pattern generator 8' corresponding to the pulse pattern generator 8 in the transmitter, the output of the modulation device being connected to a smoothing filter 20 which is connected for automatic phase correction to a frequency-determining member 21 of the local pulse pattern generator 8'.

In the receiver shown in FIG. 1 the local pulse pattern generator 8' is constructed in the same manner as the pulse pattern generator 8 in the transmitter, corresponding elements being denoted by the same reference numerals but being provided with an index. In addition the modulation device 19 is constructed as a product modulator, one input of which is connected to the receiving amplifier 5 and the other input is connected to the local pulse pattern generator 8', while the output is connected to a smoothing filter in the form of an integrating network 20 the output voltage of which controls a frequency corrector 21 which is constructed, for example, as a variable reactance and which is connected to an oscillator 16' serving as a local clock pulse generator.

In this manner on the one hand the information signal received consisting of the speech signal $s(t)$ and the pulse pattern $a(t)$ used as the address signal is applied to the product modulator 19 and on the other hand the locally generated pulse pattern which corresponds in form but not in phase with the pulse pattern $a(t)$ generated at the transmitter end, which local pulse pattern is denoted by $a(t-\tau)$ wherein $\tau$ is the time delay of the local pulse pattern relative to the pulse pattern generated at the transmitter end.

At the output of the integrating network 20 the time constant of which is of the same order of magnitude as the period $T$ of the pulse pattern $a(t)$, an output voltage will be formed of the value:

$$\int_0^T [s(t)+a(t)]\cdot a(t-\tau)dt = \int_0^T s(t)\cdot a(t-\tau)dt + \int_0^T a(t)\cdot a(t-\tau)dt \qquad (3)$$

On the basis of the noncorrelated condition of $s(t)$ and $a(t)$ the first integral in the right-hand member of (3) is substantially zero for all the value $\tau$, so that at the output of the integrating network 20 an integration voltage $R(\tau)$ is formed which is substantially equal to:

$$R(\tau) = \int_0^T [s(t)+a(t)]\cdot a(t-\tau)dt \approx \int_0^T a(t)\cdot a(t-\tau)dt \qquad (4)$$

FIGS. 2b and 2c show the pulse pattern $a(t-\tau)$ $\tau$ the variation of the integration voltage $R(\tau)$ respectively as a function of the time delay $\tau$ of the pulse pattern $a(t-\tau)$ relative to the pulse pattern $a(t)$ in FIG. 2a. As may be seen from FIG. 2c the integration voltage $R(\tau)$ *will increase proportionally with the time delay* $\tau$ *in the interval* $-D<\tau<0$ and decrease proportionally with the time delay $\tau$ in the interval $0<\tau<D$, in which the integration voltage $R(\tau)$ assumes a maximum value for $\tau=0$, that is to say, if the two pulse patterns $a(t)$ and $a(t-\tau)$ *coincide, while the integration voltage* $R(\tau)$ has a constant minimum value in the interval $D<\tau<T-D$. Since the pulse pattern $a(t)$ is periodical with a period $T$, the integration voltage $R(\tau)$ has the same periodicity. The integration voltage $R(\tau)$ shown in FIG. 2c is applied as a control voltage to the frequency corrector 21 for stabilization of the phase of the local clock pulse generator 16' at the phase of the pulse pattern $a(t)$ produced at the transmitter end.

If at a given instant, for example, when the transmission system is actuated, the locally generated pulse pattern $a(t-\tau)$ shows a time delay $\tau$ in the interval $D<\tau<T-D$ with respect to the received pulse pattern $a(t)$, an integration voltage $R\tau)$ of constant value will appear at the frequency corrector 21 as shown in FIG. 2c, so that no phase readjustment of the local clock pulse generator 16' is caused and as a result of the frequency differences always present between the clock pulse generator at the transmitter end and the local clock pulse generator 16' the pulse patterns $a(t)$ and $a(t-\tau)$ will start shifting mutually. The shifting process continues until the time delay $\tau$ of the local pulse pattern $a(t-\tau)$ comes within the interval $-D<\tau<D$ in which interval phase readjustment takes place. If, for example, the local clock pulse generator 16' has a lower frequency than that of the clock pulse generator 16 at the transmitter end and if an increase of the integration voltage $R(\tau)$ through the frequency corrector 21 results in an increase of the frequency of the local clock pulse generator 16', the frequency of the local clock pulse generator 16' will be brought accurately in agreement with the frequency of the clock pulse generator 16 at the transmitter end by the increase of the integration voltage for a time delay $\tau$ of the local pulse pattern within the interval $-D<\tau<D$. A small mutual time shift remains between the two pulse patterns $a(t)$ and $a(t-\tau)$, the value of the shift being determined inter alia by the original frequency difference between the clock pulse generators 16 and 16'.

Simultaneously the increase of the integration voltage $R(\tau)$ at the integrating network 20 which, as is described above, forms an indication of the stabilization of the local clock pulse generator 16', is used for controlling the switch 7 which precedes the reproduction device 6. For that purpose the integrating network 20 is connected to the control circuit of the switch 7 through a threshold device. In this manner the connection between the transmitter and the receiver is effected exclusively when the address signal which is characteristic of the receiver is received.

The application of the measures according to the invention not only saves in additional frequency and time space for the transmission of the address signal, but also realizes that the influencing of the speech quality by the address signal can be reduced considerably.

In fact, as a result of the integration the value of the integration voltage $R(\tau)$ at the output of the integrating network 20 upon coincidence of the pulse patterns $a(t)$ and $a(t-\tau)$ will be proportional to the number of pulses present in the pulse pattern $a(t)$ per period $T$, since in fact in the case of coincidence every pulse contributes to the integration. Thus it is possible to observe this coincidence also with great certainty when the pulse pattern $a(t)$ has a very low level, for example, is 20 dB below the level of the speech signal $s(t)$. The influencing of the speech signal $s(t)$, which is already low then, by the address signal $a(t)$ may be further reduced by subtracting in a linear difference producer 22 the locally obtained pulse pattern $a(t-\tau)$ from the information signals received consisting of the speech signal $s(t)$ and the pulse pattern $a(t)$, as a result of which the power of the address signal remaining in the speech signal $s(t)$ after this difference production is strongly reduced. In particular, by subtracting the local pulse pattern $a(t-\tau)$ from the original pulse pattern $a(t)$, the difference voltage shown in FIG. 2d is formed which is the result of the small time delay $\tau$ of the local pulse pattern $a(t-\tau)$ with respect to the original pulse pattern $a(t)$ which is always present in the case of phase stabilization. Not only is the power of the address signal remaining in the speech signal reduced by this difference production, but also the frequency spectrum of the difference signal with respect to that of the original pulse pattern $a(t)$ is thus shifted to higher frequencies which renders a further attenuation possible with the use of a network which attenuates the high frequencies in the form of a de-emphasis network 23. Of the original address signal $a(t)$ (compare FIG. 2a) in the speech signal $s(t)$ only the small residual signal as shown in FIG. 2e remains at the output of the de-emphasis network 23. For the speech signal $s(t)$ a corresponding pre-emphasis network 24 should be used at the transmitter end.

By the collective effect of integration, difference production and de-emphasis the use of the measures described renders a particularly efficient reduction of the influence of the address signal on the speech signal possible, in which in a simple manner a reduction to 50 to 60 dB below the level of the speech signal can be reached.

In the transmission system according to the invention the transmission of the address signal takes place in this manner without frequency separation and without time separation within the speech band, while nevertheless the speech quality is substantially not influenced by the address signal.

Figure 3:
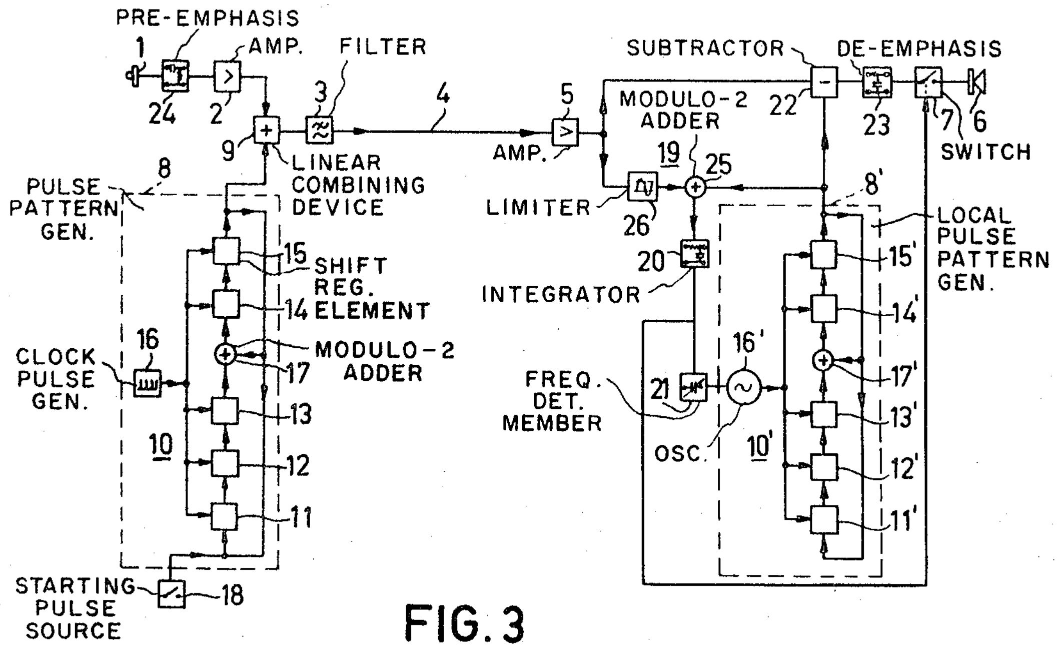
FIGS. 3 and 4 show variations of the transmission system shown in FIG. 1.

FIG. 3 shows a variation of the transmission system according to the invention in which elements corresponding to FIG. 1 are denoted by the same reference numerals.

The difference of this transmission system with respect to that shown in FIG. 1 lies in the construction of the modulation device 19 which in this system consists of a modulo-2-adder 25 preceded by a limiter 26 so that the received information signals are converted into a bivalent signal.

The operation of the receiver corresponds essentially to that of the receiver shown in FIG. 1; in particular, the integration voltage occurring at the output of the integrating network 20 also shows the variation as shown in FIG. 2*c*.

However, the construction of the receiver shown in FIG. 3 is to be preferred since the modulo-2-adder 25 preceded by a limiter 26 constitutes a simpler and more reliable modulation device than the product modulator used in FIG. 1.

Figure 4:
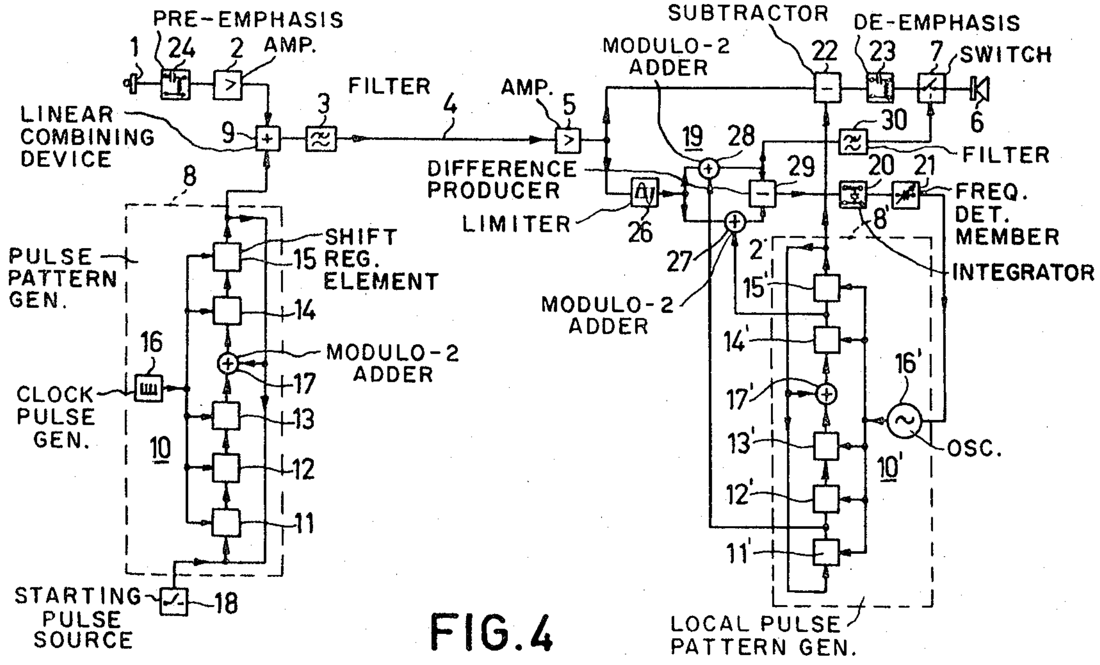

FIG. 4 shows a preferred embodiment of the transmission system according to the invention in which elements corresponding to FIGS. 1 and 3 are again denoted by the same reference numerals. Instead of a single modulation device as in FIGS. 1 and 3, a double modulation device is used.

In the embodiment shown the modulation device 19 comprises two modulo-2-adders 27, 28 which are connected with their first inputs in parallel arrangement to the limiter 26 and the output terminals of which are connected to a linear difference producer 29 the output voltage of which is applied to the integrating network 20. The local pulse pattern $a(t-\tau+D)$ advanced over one shift period $D$ is applied to the second input of the modulo-2-adder 27, while the second input of the modulo-2-adder 28 is applied the local pulse pattern $a(t-\tau-D)$ delayer over one shift period $D$, which advanced and delayed local pulse patterns are derived from the outputs of the shift register elements 14' and 11 ', respectively. An integration voltage will then be formed at the output of the integrating network 20 which voltage as a function of the time delay $\tau$ has the variation as shown in FIG. 2*f* with a radial symmetry for $\tau = 0$. The control of the switch 7 preceding the reproduction device 6 is effected in this case by the output voltage of the modulo-2-adder 28 through a smoothing filter 30 in the form of an integrating network.

In the same manner as explained with reference to the transmission systems shown in FIGS. 1 and 3 a phase stabilization is obtained in this case of the local clock pulse generator 16' at the phase of the pulse pattern generated at the transmitter end. The double construction of the modulation device 19, however, presents the advantage that the variation of the integration voltage shown in FIG. 2*f* makes it possible that the time delay $\tau$ of the local pulse pattern $a(t-\tau)$ with respect to the original pulse pattern $a(t)$ which is already small in the case of phase stabilization can now be reduced to substantially zero.

The above described transmission systems according to the invention are always constructed for the transmission of one speech signal as a main information signal, while an address signal is always used as an auxiliary information signal.

Figure 5:
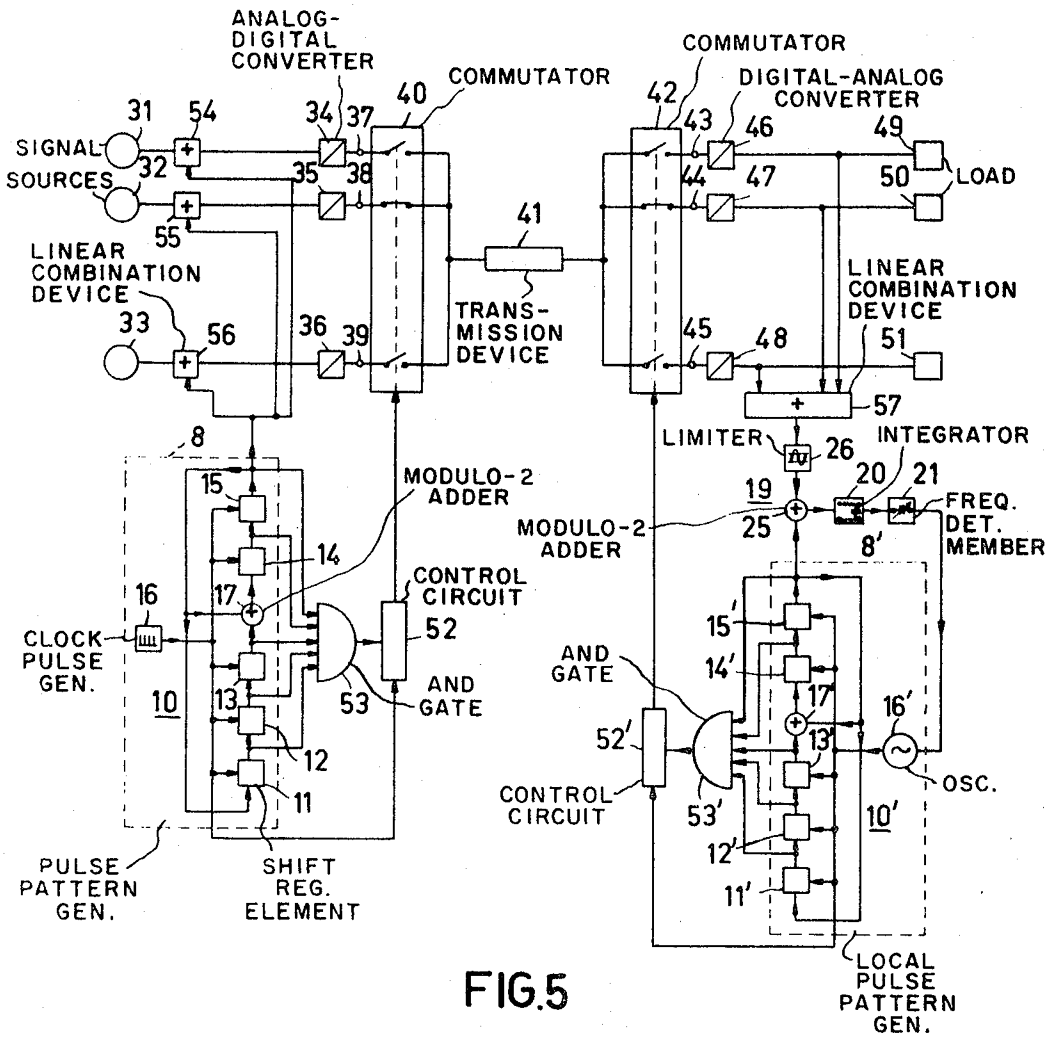
FIGS. 5 and 6 show transmission systems according to the invention which are constructed for the transmission of a number of main information signals through a common transmission path in time multiplex.
Figures 6, 7:
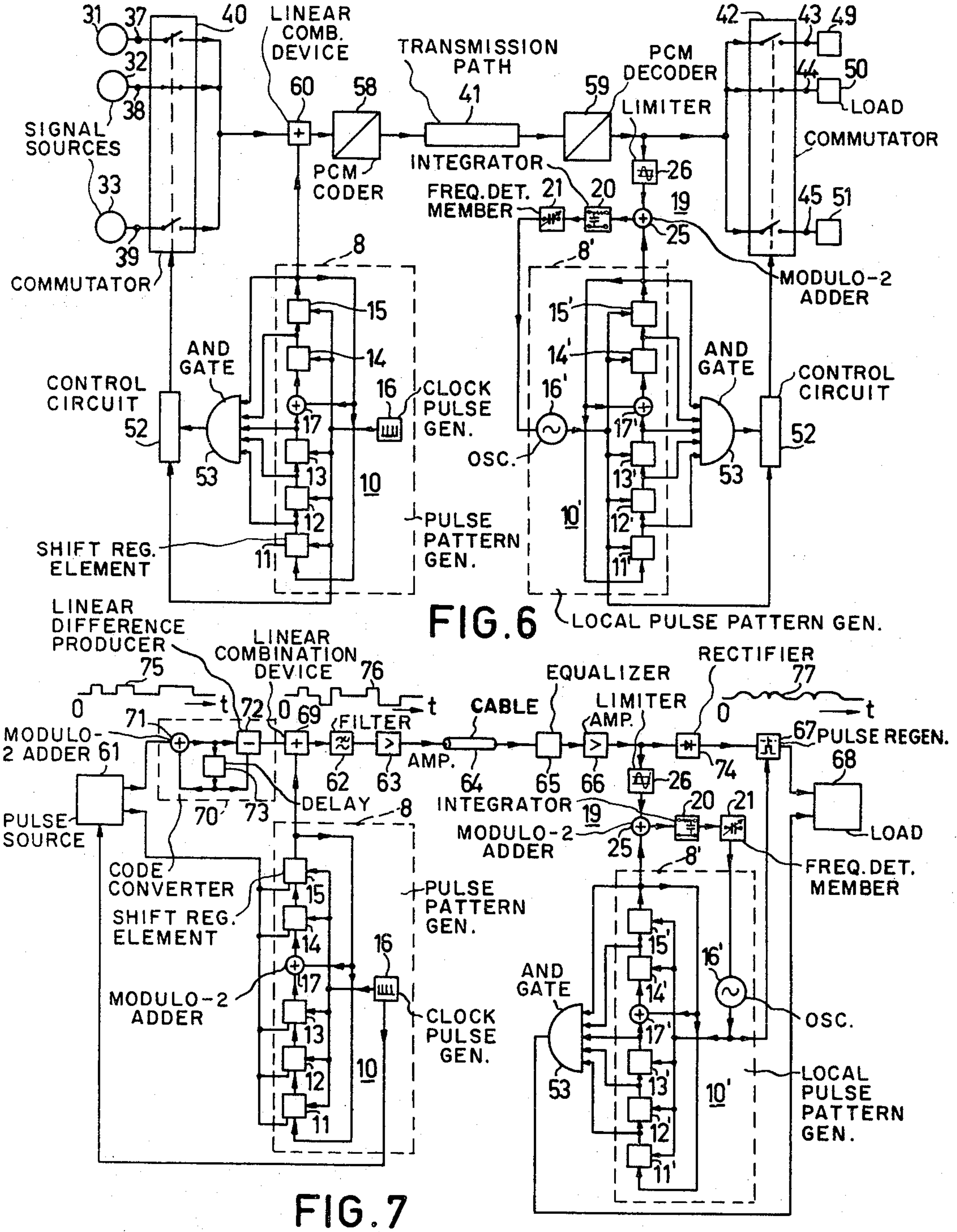
FIG. 7 shows a transmission system according to the invention which is constructed for the transmission of a main information signal in the form of pulses.

In the embodiments shown in FIGS. 5 and 6 on the contrary a large number of main information signals are transmitted through a common transmission path successively in time multiplex, the auxiliary information signal being used as a synchronization signal in restoring the individual main information signals at the receiver end.

The transmission system according to the invention shown in FIG. 5 is constructed for the transmission of a number of speech signals, each originating from an individual signal source 31, 32 . ., 33 and each having a bandwidth of, for example, 0–4 KHz. At the transmitter end in this transmission system each source 31, 32. . . . , 33 is connected, through an individual line including analog-to-digital converters 34, 35. . ., 36, for example, in the form of a deltamodulator, to one of the inputs 37, 38. . ., 39 of commutator 40 by means of which the speech signals in a digital form are transmitted successively in time multiplex through a transmission path 41. At the receiver end each of the speech signals is restored in a digital form from the transmitted time multiplexing signal by means of a corresponding commutator 42 and applied to one of the commutator outputs 43, 44. . . , 45 which are each connected, through individual lines in which digital-to-analog converters 46, 47 . . . . ,48 corresponding to the analog-to-digital converter are incorporated, for example, in the form of an integrating network associated with the delta-modulator, to a separate load 49, 50 . . . . 51.

For controlling the commutator 40 at the transmitter end the clock pulse generator 16 in the pulse pattern generator 8 which is constructed in the same manner as in the preceding transmission systems, is also connected to a control circuit 52 of the commutator 40, the control circuit 52 determining which commutator input 37, 38. . . . . , 39 is connected to the transmission path 41 at a given instant. The initial position of the commutator 40 in which, for example, the first commutator input 37 is connected to the transmission path 41, is coupled with a given condition of the shift register 10 in the pulse pattern generator 8, which condition, as is known, occurs only once per period T of the generated periodic pulse pattern. For that purpose, in the embodiment shown, the output of each shift register element 11, 12, 13, 14, 15 is connected to an individual input of an AND-gate 53 which supplies an output pulse only when simultaneously a pulse appears at the output of all the shift register elements 11, 12, 13, 14 and 15, which output pulse each time resets the commutator 40 to its initial position through the control circuit 52.

At the receiver end the control of the commutator 42 is effected in quite the same manner as at the transmitter end, corresponding elements in FIG. 5 for the devices being denoted by the same reference numerals but being provided with an index.

For the mutual synchronization of the commutators 40, 42 at the transmitter and receiver ends a synchronization signal is also transmitted in this transmission system together with the speech signals for which, as already described above, no additional frequency and time space is necessary.

For that purpose, at the transmitter end the pulse pattern occurring at the output of the pulse pattern generator 8 is added as a synchronization signal by means of linear combination devices 54, 55. . . , 56 without frequency separation and without time separation to each speech signal within the speech band of 0–4 KHz. At the receiver end the restored information signals, consisting of the speech signals and the synchronization signals added to each of them, are combined in a linear combination device 57 and, like the locally generated pulse pattern, applied to the modulation device 19 which is constructed in the manner already described with reference to FIG. 3 and the output voltage of which controls the frequency corrector 21 connected to the local clock pulse generator 16' through the integrating network 20.

In the manner already described above in detail a phase stabilization on the local clock pulse generator 16' at the phase of the pulse pattern produced at the transmitter end is obtained, said pulse pattern and the local pulse pattern coinciding and consequently also the conditions of the shift registers 10, 10' at the transmitter and receiver ends being the same at any moment so that an accurate synchronization of the commutators 40, 42 at the transmitter and receiver ends is obtained.

Influencing of the speech quality by the synchronization signal can be reduced particularly efficiently in this case by using the measures already described above and not shown in the FIG. 5, for example, subtracting the local pulse pattern from the restored information signals and including de-emphasis networks, while in the transmission system shown in FIG. 5 a further reduction is possible since in the combination of the restored information signals at the receiver end the synchronization signals which are equal for each speech signal contribute systematically to the output signal of the linear combination device 57, whereas the mutually independent speech signals do not give a systematic but rather a random contribution so that at the transmitter end the level of the synchronization signal which is already low with respect to that of the speech signals can be further reduced. In particular the level of the synchronization signal can be reduced by a factor $\sqrt{m}$, wherein $m$ is the number of speech signals to be transmitted.

In this manner in a transmission system of the time multiplex type it is achieved that the full time space is available for the transmission of the speech signals while nevertheless an accurate mutual synchronization of the commutators 40, 42 at the transmitter and receiver ends is effected without increasing the frequency band.

FIG. 6 shows a variation of the transmission system shown in FIG. 5 in which corresponding elements are denoted by the same reference numerals. The transmission system shown in FIG. 6 which is constructed, for example, for the transmission of a number of telemetry signals differs from the transmission system shown in FIG. 5 as regards the formation of the time multiplex signal and the addition of the synchronization signal to the telemetry signals.

In fact, at the transmitter end a time multiplex signal is formed first from the telemetry signals which time multiplexing signal is then applied to an analog-to-digital converter in the form of a PCM coding device 58 while at the receiver end the original time multiplex signal is regained by means of a corresponding PCM-decoding device 59 from which latter signal the individual telemetry signals are then restored. In addition, the pulse pattern used at the transmitter and receiver ends 40, 42 for the mutual synchronization of the commutators is added to the total time multiplex signal in a linear combination device 60 and not to the telemetry signals individually.

These measures present the advantage that for the pulse pattern serving as a synchronization signal the full frequency band of the time multiplex signal is now available instead of the frequency band of a single telemetry signal so that in this case a more sensitive synchronization control and a more rapid operation of the phase control are achieved.

FIG. 7 shows a transmission system according to the invention which is constructed for the transmission in a prescribed transmission band of a main information signal in the form of bivalent pulses the presence and absence of which characterize the main information signal and the instants of occurrence of which coincide with a series of equidistant clock pulses, for example, originating from the clock pulse generator 16 in the pulse pattern generator 8. Furthermore the bivalent pulse signals are arranged in successive pulse groups each consisting of 31 elements in which, for example, the first 26 elements in a pulse group contain the actual main information and the following $(31-26) = 5$ elements constitute the parity check of the main information as, for example, in a cyclic (31,26)-code.

In this transmission system the pulse signals originating from a pulse source 61 are applied to a transmission path in the form of a cable 64 through a low-pass filter 62 having a cut-off frequency equal to half the clock pulse frequency and a pulse amplifier 63, and are transmitted to the receiver comprising successively an equalizing network 65 for equalizing the amplitude and phase characteristics of the transmission path 64, a pulse amplifier 66, a pulse regenerator 67 for regenerating the received signal pulses according to form and instant of occurrence and a load 68.

In order that the load 68 may know the instant of beginning of each pulse group, a group synchronization signal for marking the instant of beginning of a pulse group is also transmitted in this transmission system in addition to the main information signal, for which, as already explained in detail above, no additional frequency and time space is necessary.

A given condition of the shift register 10 in the pulse pattern generator 8 is coupled to the instant of beginning of a pulse group for which purpose in this embodiment a group synchronization pulse occurring at that instant at an individual output of the pulse source 61 is applied to all the shift register elements 11, 12, 13, 14, 15 through individual inputs in order to bring the shift register 10 in that condition in which a pulse appears simultaneously at the outputs of all the shift register elements 11, 12, 13, 14, 15. The pulse pattern occurring at the output of the pulse pattern generator 8 is added within the prescribed transmission band to the main information signal with a level of, for example, 20 dB below that of the main information signal in a linear combination device 69 without frequency separation and without time separation.

For producing the local group synchronization signal at the receiver end the same devices are used in the transmission systems shown in FIGS. 5 and 6 for restoring the synchronization signal, corresponding elements being denoted by the same reference numerals. The phase stabilization also of the local clock pulse generator 16' at the phase of the pulse pattern produced at the transmitter end is effected entirely in the manner described in detail above, in which the shift registers at the transmitter and receiver ends 10, 10' are in the same condition at any moment and consequently the group synchronization pulses occurring at the output of the AND-gate 53 and applied to the load 68 coincide accurately with the group synchronization pulses supplied by the pulse source 61. The clock pulses of the local clock pulse generator 16' are used also in this case for controlling the pulse regenerator 67.

In order to reduce the possibility of insufficient or faulty phase stabilization it is of advantage to increase the difference between the main information signal and the group synchronization signal which two signals are formed by bivalent pulse series in the transmission system described thus far, by converting one of these bivalent pulse series into a multivalent pulse series. For that purpose, the bivalent pulse series of the main information signal, for example, may be converted by means of a code converter 70 into a trivalent pulse series in the manner already described in prior U.S. Pat. No. 3,456,199. In particular, the code converter 70 in this transmission system at the transmitter end is constituted by a modulo-2-adder 71 succeeded by a linear difference producer 72, the output of the modulo-2-adder being connected, through a delaying network 73 having a delay time of 2 clock pulse periods, to the interconnected second inputs of the modulo-2-adder 71 and the linear difference producer 72, while at the receiver end the original bivalent pulse series is obtained by means of a two-phase rectifier 74. For illustrating the code conversion FIG. 7 shows a pulse series 75 at the input of the code converter 70 and the associated pulse series 76, 77 at the output of the code converter 70 and the two phase rectifier 74, respectively.

Figure 8:
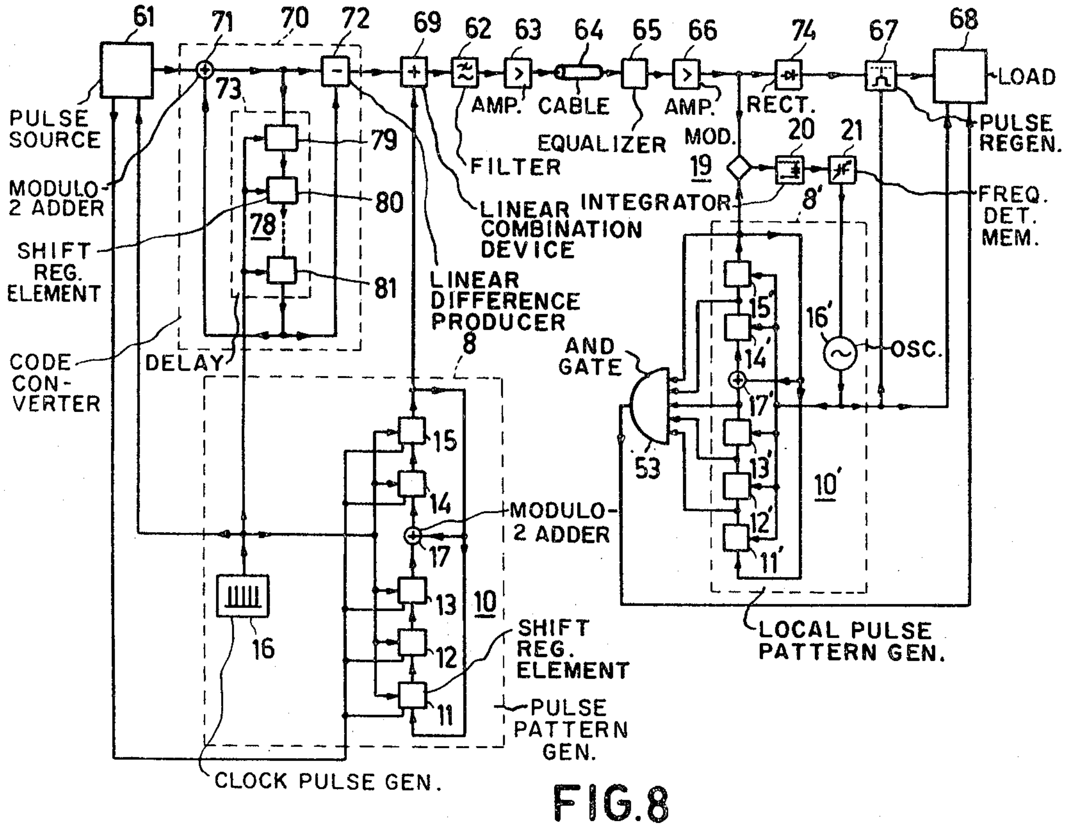
FIG. 8 shows an advantageous variation of the transmission system shown in FIG. 7

FIG. 8 shows an advantageous variation of the transmission system shown in FIG. 7 in which corresponding elements are denoted by the same reference numerals.

In the transmission system shown in FIG. 8 the delaying network 73 incorporated in the code converter 70 is constituted by a shift register 78 having more than two cascade-arranged shift register elements 79, 80. . . . . ,81 the contents of which are shifted by the clock pulse generator 16 connected to the shift register 10 of the pulse pattern generator 8. If the delaying network 73 has a total delay time V, spectral zero points occur in the frequency spectrum of the trivalent pulse series at the output of the code converter 70 at the frequencies $f=k/V$ with $k = 0, 1, 2, 3, \ldots$ (see the above-mentioned U.S. Pat. No. 3,456,199. In the preferred embodiment shown in FIG. 8, the number N of the shift register elements 79, 80,....,81 in the code converter 70 is equal to the number of shift periods $D$ occurring per period $T$ of the produced pulse pattern, which in the present period of the pulse pattern $T= 31\ D$ thus means a number of shift register elements $N= 31$ and a total delay time $V=ND= 31\ D$.

Figure 9:
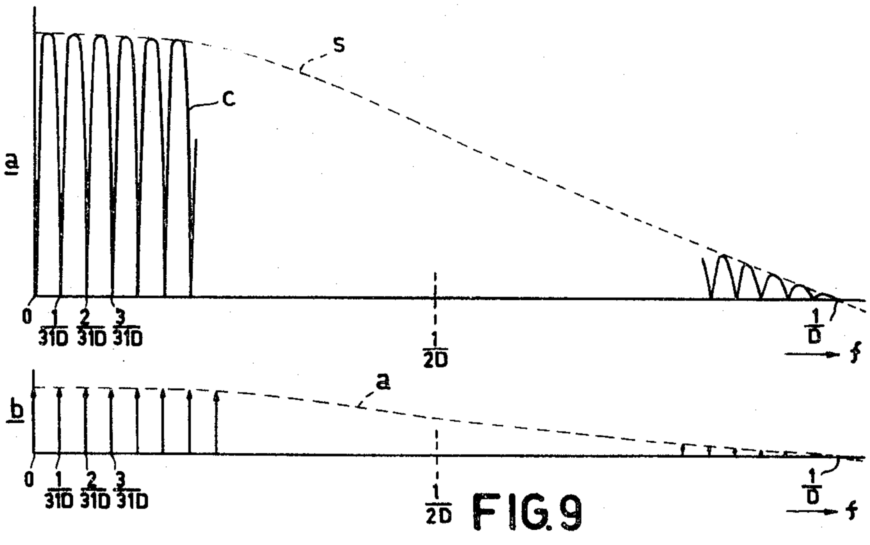
FIG. 9 shows a few frequency diagrams to explain the transmission system shown in FIG. 8.

With this choice of the number of shift register elements $N$, single spectral zero points occur in the frequency spectrum of the trivalent pulse series of the coded main information signal $c(t)$ at the frequencies $f=k/ND=k/31\,D$ with $k=0, 1, 2, 3, \ldots$, as is shown in FIG. 9 at $a$ for a main information signal $s(t)$ with pulses of width $D$, while the periodic pulse pattern $a(t)$ with a period $T=31\,D$ — as shown at $b$ in FIG. 9 for pulses likewise having a width $D$ — has a line spectrum with exclusively frequency components at the frequencies $f=k/T=k/31D$ with $k=0, 1, 2, 3, \ldots$, so that the frequency components of the periodic pulse pattern $a(t)$ coincide accurately with the single zero points in the spectrum of the coded main information signal $c(t)$. FIG. 9 further shows the cut-off frequency $f_o=1/2D$ of the low-pass filter 62.

Because the shift registers 78 and 10, respectively, in the code converter 70 and the pulse pattern generator 8 are connected in common to the same clock pulse generator 16, in the frequency spectrum any shift of the zero points of the coded main information signal $c(t)$ and the spectrum components of the pulse pattern $a(t)$ with respect to each other is avoided, also in case of variation of the clock pulse frequency which are expressed in variations of the shift period D.

By the use of these measures, a particularly accurate phase stabilization of the local clock pulse generator 16' at the phase of the pulse pattern produced at the transmitter end is obtained. This also appears from the fact that the interference term which denotes the influence of the main information signal $s(t)$ on the control voltage for the phase stabilization occurring at the output of the integrating network 20, is given, in the devices shown in FIGS. 1, 3, 4, 5, 6 and 7, by the integral given in formula (1):

$$I(\tau)=\int_0^T s(t)\cdot a(t-\tau)dt$$

which, on the basis of the substantially noncorrelated condition of $s(t)$ and $a(t)$, is substantially zero for all the values $\tau$ as denoted by formula (2):

$$I(\tau)\approx 0; -\infty<\tau<\infty,$$

while in the device shown in FIG. 8, as a result of the code conversion of $s(t)$ into $c(t)$, the interference term, which is now given by the integral $$I_c(\tau)=\int_0^T c(t)\cdot a(t-\tau)dt, \qquad (5)$$

is exactly zero for all the values of $\tau$, in formula:

$$I_c(\tau)=0; -\infty<\tau<\infty \qquad (6)$$

The very accurate phase stabilization of the local clock pulse generator 16' as a result of the substantially entirely interference-free phase control voltage is also maintained when the clock pulse frequency varies, since the frequency components in the line spectrum of $a(t)$ even then remain coinciding accurately with the single zero points in the spectrum of $c(t)$.

In transmitting main information signals in the form of a bivalent pulse series in which the instants of occurrence of the pulses coincide with a series of equidistant clock pulses, influencing of the phase stabilization of the local clock pulse generator 16' by the main information signals to be transmitted is reduced to zero in this single manner and consequently a particularly accurate phase stabilization is effected.

If required, the level with which the pulse pattern in the transmitter is applied to the main information signal may be further reduced without any harmful influence on the phase stabilization, in order to further reduce the influence of the pulse pattern on the main information signal. It is found in practice, however, that such a reduction is not necessary, since the disturbing influence of the pulse pattern on the pulse regeneration in the pulse regenerator 67 is already very low also as a result of the clock pulse frequency being very fixed in the case of accurate phase stabilization.

In the case of a number of shift register elements $N$ in the shift register 78 of the code converter 70 differing from that which corresponds to the number of shift periods $D$ occurring per period $T$ of the pulse pattern, multiplied by an integer number $m=1, 2, 3, \ldots$, a part of the spectrum components of the pulse pattern coincides with the spectral zero points of the coded main information signal, as a result of which some improvement of the phase stabilization is already obtained. However, the described proportioning of the number of shift register elements $N$, given by $ND=mT$ with $m=1, 2, 3, \ldots$, gives optimum results since in that case all the spectrum components of the pulse pattern coincide with the spectral zero points of the coded main information signal.

For completeness' sake it is to be noted that in the code converter 70, instead of a linear difference producer 72 and a modulo-2-adder 71, a linear adder and a modulo-2-difference producer consisting of an invertor and a modulo-2-adder may alternatively be used, but in this case also not all the spectrum components of the pulse pattern coincide with the spectral zero points of the coded main information signal, since these zero points in their frequency location correspond to a series of odd numbers, while the spectrum components of the pulse pattern in their frequency location correspond to a series of natural numbers.

Of course, the pulse pattern shown in FIG. 2a may also be obtained in a different manner, for example, by means of so-called word generators which are used for testing telegraphy connections. The number of $n$ shift register elements 11, . . . . . 15 may also be chosen to be different from the embodiments shown which, as already indicated, with a suitable construction of the feedback coupling through modulo-2-adders 17 between the shift register elements 11, . . . . . . 15, results in pulse patterns $a(t)$ with a period $T=(2^n-1)D$, the integration voltage $R(\tau)$ with a single construction of the modulation device 19 showing a variation corresponding to FIG. 2c.

In addition to the periodic pulse patterns $a(t)$ particularly suitable for phase stabilization in which the integration voltage $R(\tau)$ exclusively for $\tau=0$ and $\tau=T$ has a maximum value and in the time interval between $\tau=D$ and $\tau=T-D$ has a constant minimum value, also periodic pulse patterns $a(t)$ may be used in which the integration voltage $R(\tau)$ again has a maximum for $\tau=0$ and $\tau=T$ but in the time interval between $\tau=D$ and $\tau=T-D$ a few peak values of smaller amplitude occur. Any influence of the phase stabilization by these peak values of smaller amplitude may be prevented in a simple manner by including after the integrating network 20 a threshold device which does not pass these peak values of smaller amplitude.

What is claimed is:

1. A transmitter for the transmission of signals comprising a source of information signals having a predetermined frequency bandwidth, a source of a pseudorandom pulsatory signal having a predetermined periodic pulse pattern, being within said frequency bandwidth and having an amplitude substantially less than said information signals, means for linearly combining said information signals and pulsatory signal to produce an output signal in which said information signals and pulsatory signals occur simultaneously and without frequency separation, and means for transmitting said output signal.

2. A transmitter as claimed in claim 1 wherein said information signal comprises bivalent pulses, and further comprising means for converting a bivalent pulse series into a multivalent pulse series coupled to an input of said combining means.

3. A transmitter as claimed in claim 2 wherein the pulse pattern generator comprises a feed back shift register having a number of shift register elements, and a clock pulse generator for producing clock pulses connected thereto, said information signal pulses occuring at instants which coincide with said clock pulses, and being applied to a code converter, said code converter comprising a delaying network and a second linear combination device coupled to said delaying network for receiving said information pulses directly and through said delaying network, said delaying network comprising a shift register having more than two cascade-arranged shift register elements shifted by the clock pulse generator connected to the shift register of the pulse pattern generator.

4. A transmitter as claimed in claim 3, wherein said second linear combination device in the code converter comprises a linear difference producer, and the number of shift register elements of the shift register in the code converter is equal to the number of shift periods occurring per period of the produced pulse pattern multiplied by an integer number.

5. A transistor as claimed in claim 1 wherein said pseudorandom signal source comprises a shift register having a plurality of cascade-arranged shift register elements, a modulo-2 adder coupled between adjacent shift resistor elements, the output of the shift register being fed back to the input and to the modulo-2-adder, and a clock pulse generator connected to said elements.

6. A transmitter as claimed in claim 5 further comprising a starting pulse source coupled to the input of the shift register.

7. A transmitter as claimed in claim 1 wherein said source of an information signal comprises a plurality of individual information signal sources and further comprising a commutator coupled to said individual signal sources, said combination device being coupled between said commutator and said transmission means.

8. A transmitter as claimed in claim 7 wherein said source of pulse signals comprises a plurality of coupled shift register elements and an AND gate having inputs coupled to the outputs of said shift register elements and an output coupled to control said commutator.

9. A transmitter as claimed in claim 1 wherein said source of an information signal comprises a plurality of individual information signal sources and said combination means comprises a plurality of individual combination means coupled to said information signal sources respectively, and to said pulse source, and further comprising a commutator coupled between said individual combination means and said transmitting means.

10. A transmitter as claimed in claim 9 wherein said source of pulse signals comprises a plurality of coupled shift register elements and an AND gate having inputs coupled to the outputs of said shift register elements and an output coupled control said commutator.

11. A transmitter as claimed in claim 1 further comprising a clock pulse generator and wherein said information signal comprises pulses the instants of occurrence of which coincide with the clock pulses, said main information pulses being arranged in successive groups of constant length and having group synchronization pulses, wherein said group synchronization pulses supplied by the main information source set the pulse pattern generator into a selected condition and the pulse pattern as a group synchronization signal is combined in the linear combination device with the main information pulses.

12. A transmitter as claimed in claim 1 further comprising a preemphasis network coupled between said source of information signals and said combining means.

13. A receiver comprising means for simultaneously receiving within the same bandwidth information signals and a pseudorandom pulsatory signal having a periodic pulse pattern and an amplitude substantially less than said information signals, a source of a local pulsatory signal having the same pulse pattern as the received pulsatory signal, modulator means, means applying said local pulsatory signal and said received signals to said modulator means to produce a control signal, means applying said control signal to said source of local pulsatory signal for synchronizing said local pulsatory signal with said received pulse signal, an output circuit, and means responsive to the synchronization of said local pulsatory signal with said received pulsatory signal for applying said received signals to said output circuit.

14. A receiver as claimed in claim 13 wherein said applying means comprises a filter and a frequency-determining member coupled to said filter, the output of the modulation device being connected to said filter, said frequency-determining member being coupled to said source of local pulse signals.

15. A receiver as claimed in claim 14, wherein the source of local pulse signals comprises a shift register having a number of cascade-arranged shift register elements, a modulo-2-adder coupled between said elements, the output of the shift register being fed back to the input and to the modulo-2-adder, and a clock pulse generator coupled to said elements, the contents of the shift register elements being shifted by said clock pulse generator connected thereto.

16. A receiver as claimed in claim 15 further comprising a pulse regenerator coupled to said output circuit, and an AND gate coupled to said shift register elements, the output signal of said AND gate being applied to said output circuit as a group synchronization signal, the clock pulses of the local pulse source being applied to the pulse regenerator for control purposes.

17. A receiver as claimed in claim 14 wherein the modulation means comprises a modulo-2-adder and a limiter coupled to said adder.

18. A receiver as claimed in claim 17, wherein said modulation means comprises a second modulo-2-adder having an input coupled to the output of the limiter, and said linear difference produce, the output terminals of said modulation modulo-2-adders being coupled to the inputs of said linear difference producer, the output of said difference producer being coupled to the smoothing filter.

19. A receiver as claimed in claim 14 further comprising a commutator having an input coupled to the modulation device.

20. A receiver as claimed in claim 19 further comprising an AND gate coupled to each shift register element, the output signal being applied to control said commutator.

21. A receiver as claimed in claim 14 further comprising a commutator coupled to said receiving means and a third linear combination device coupled to the outputs of said commutator and to the modulation device.

22. A receiver as claimed in claim 21 further comprising an AND gate coupled to each shift register element, the output signal of said gate being applied to control the commutator.

23. A receiver as claimed in claim 13 further comprising a second linear difference producer for receiving said input signals and said local pulse signals and being coupled to said output circuit.

24. A receiver as claimed in claim 23 wherein said information signal comprises speech signals, and further comprising a de-emphasis network coupled between the second linear difference producer and said output circuit.

25. A receiver as claimed in claim 13 wherein said responsive means comprises a smoothing filter coupled between said modulation device and said output circuit.

26. A receiver as claimed in claim 13 wherein said main information signals comprises multivalent signals and wherein the receiver further comprises an inverse code converter and means for converting the multivalent pulse series into a bivalent pulse series.

27. A transmission system for the transmission of signals in a predetermined band, comprising a transmitter, a receiver, and a transmission path between said transmitter and receiver, said transmitter comprising a source of information signals, a source of a pulsatory signal having a predetermined periodic pulse pattern that is not correlated with said information signals and an amplitude substantially less than said information signals, means for linearly combining said information signals and pulsatory signal to produce an output signal in which said information signals and pulsatory signals occur simultaneously and without frequency separation within a predetermined bandwith, and means applying said output signal to said path; said receiver comprising a source of a local pulsatory signal corresponding to the pulsatory signal produced in said transmitter, modulator means, means applying said local pulsatory signal and signals received from said path to said modulator means to produce a control signal, means applying said control signal to said source of local pulsatory signal for synchronizing said local pulsatory signal, an output circuit, and means responsive to the reception of a pulsatory signal corresponding to said local pulsatory signal for applying signals from said path to said output circuit.

* * * * *